(12) United States Patent
Aoki et al.

(10) Patent No.: US 8,196,351 B2
(45) Date of Patent: Jun. 12, 2012

(54) POWER FEEDING APPARATUS FOR SLIDABLE STRUCTURAL BODY

(75) Inventors: Tohru Aoki, Kosai (JP); Hiroshi Yamashita, Kosai (JP); Kazuhiro Tsuchida, Kosai (JP); Mitsunori Tsunoda, Kosai (JP); Tomoaki Nishimura, Kariya (JP); Motonari Inagaki, Nishikasugai-gun (JP)

(73) Assignees: Yazaki Corporation, Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 795 days.

(21) Appl. No.: 11/938,863

(22) Filed: Nov. 13, 2007

(65) Prior Publication Data

US 2009/0223132 A1    Sep. 10, 2009

(30) Foreign Application Priority Data

Nov. 13, 2006   (JP) .................................. 2006-306642
Feb. 7, 2007    (JP) .................................. 2007-27710

(51) Int. Cl.
    *E05F 11/00*       (2006.01)
(52) U.S. Cl. ........................................................ 49/360
(58) Field of Classification Search .................... 49/360, 49/167; 296/155
    See application file for complete search history.

(56) References Cited

U.S. PATENT DOCUMENTS

| | | | | |
|---|---|---|---|---|
| 2,115,811 A | * | 5/1938 | Hansen .......................... | 16/86 C |
| 4,445,299 A | * | 5/1984 | Lehikoinen et al. ............ | 49/167 |
| 5,879,047 A | * | 3/1999 | Yamaguchi et al. ........ | 296/146.7 |
| 5,930,954 A | * | 8/1999 | Hebda .............................. | 49/345 |
| 6,492,592 B1 | * | 12/2002 | Murofushi et al. ......... | 174/72 A |
| 6,603,076 B2 | * | 8/2003 | Doshita et al. .............. | 174/72 A |
| 6,724,613 B2 | * | 4/2004 | Doshita et al. ............... | 307/10.1 |
| 6,742,303 B2 | * | 6/2004 | Pedemonte ..................... | 49/339 |
| 7,082,720 B2 | * | 8/2006 | Kobayashi et al. ............. | 49/360 |
| 7,265,294 B2 | * | 9/2007 | Tsunoda et al. ............. | 174/72 A |
| 7,284,785 B2 | * | 10/2007 | Gotou et al. .................. | 296/155 |
| 7,482,538 B2 | * | 1/2009 | Kisu et al. .................... | 174/72 A |
| 7,686,380 B2 | * | 3/2010 | Ochi ............................. | 296/155 |
| 7,690,718 B2 | * | 4/2010 | Blase ............................ | 296/155 |
| 2003/0184119 A1 | * | 10/2003 | Doshita et al. ................ | 296/155 |
| 2004/0003543 A1 | * | 1/2004 | Kobayashi et al. ............. | 49/360 |

(Continued)

FOREIGN PATENT DOCUMENTS

JP    62-15897 A    1/1987

(Continued)

OTHER PUBLICATIONS

Notification of Reason for Refusal issued May 18, 2010, in counterpart Japanese Application No. 2007-027710.

*Primary Examiner* — Jerry Redman

(74) *Attorney, Agent, or Firm* — Sughrue Mion, PLLC

(57) ABSTRACT

A power feeding apparatus for a slidable structural body includes a link arm which is provided on one of the slidable structural body and a fixed structural body so as to be pivotally moved in a harness surplus length-absorbing direction of a wire harness, a harness holding member which is provided on a distal end side of the link arm so as to be pivotally moved in a harness pulling direction of the wire harness, and a harness fixing portion provided on the other of the slidable structural body and the fixed structural body, and wire harness is installed to extend from the harness holding member to the harness fixing portion.

11 Claims, 16 Drawing Sheets

U.S. PATENT DOCUMENTS

| | | | |
|---|---|---|---|
| 2004/0083655 A1* | 5/2004 | Suzuki et al. | 49/360 |
| 2004/0084932 A1* | 5/2004 | Suzuki et al. | 296/155 |
| 2005/0264033 A1* | 12/2005 | Aoki et al. | 296/155 |
| 2007/0157523 A1* | 7/2007 | Kuhnen et al. | 49/502 |
| 2009/0044455 A1* | 2/2009 | Enomoto et al. | 49/360 |

FOREIGN PATENT DOCUMENTS

| | | |
|---|---|---|
| JP | 4-221893 A | 8/1992 |
| JP | 2001-122054 A | 5/2001 |
| JP | 2001-151042 A | 6/2001 |
| JP | 2001-197649 A | 7/2001 |
| JP | 2001-260770 A | 9/2001 |
| JP | 2002-17032 A | 1/2002 |
| JP | 3301021 B2 | 4/2002 |
| JP | 2002-144981 A | 5/2002 |
| JP | 2003-32868 A | 1/2003 |
| JP | 2003-32869 A | 1/2003 |
| JP | 2003-117878 A | 4/2003 |
| JP | 2006-27372 A | 2/2006 |

* cited by examiner

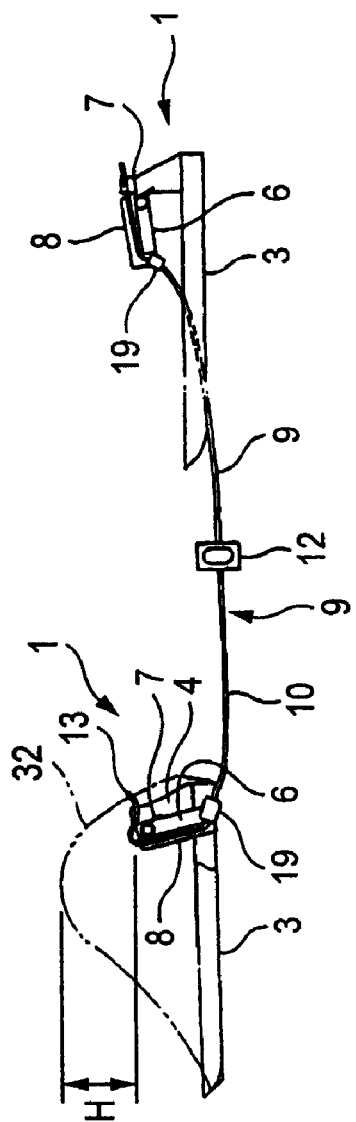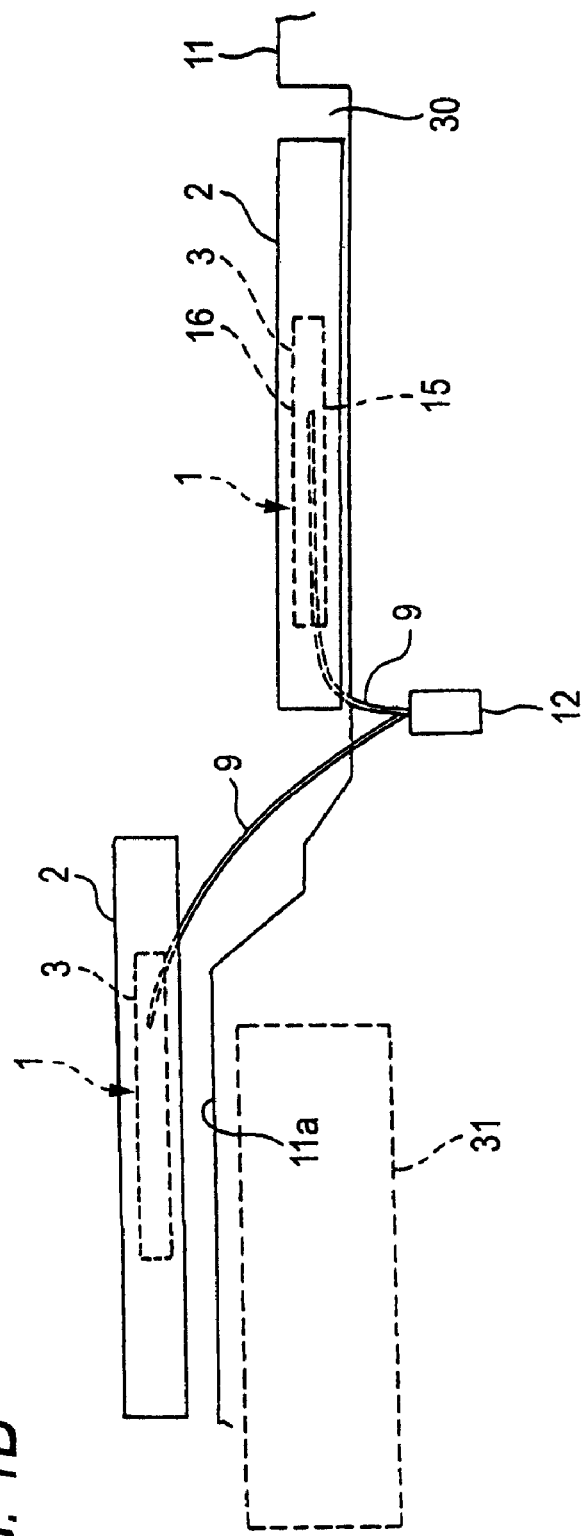
FIG. 1A
FIG. 1B

FIG. 4A
FIG. 4B
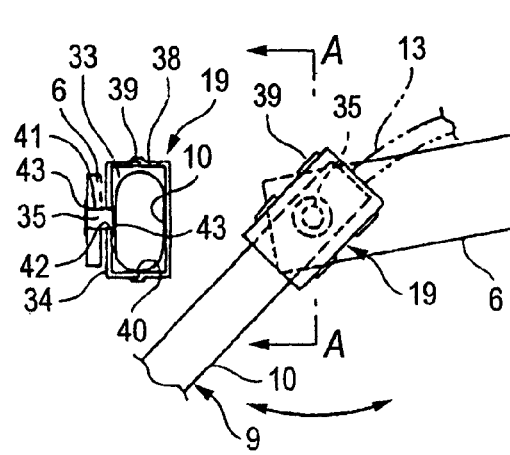
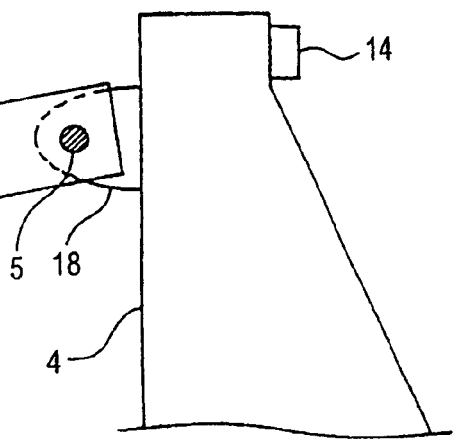

POWER FEEDING APPARATUS FOR SLIDABLE STRUCTURAL BODY

BACKGROUND

This invention relates to a power feeding apparatus for a slidable structural body in which a wire harness is installed by the use of a pivotal link arm in order to continuously feed power to the slidable structural body such as a slide door of an automobile from a fixed structural body such as a vehicle body.

FIG. 13 shows a first form of a conventional power feeding apparatus for a slidable structural body (see Patent Literature 1).

This power feeding apparatus 51 includes a guide rail 53 provided horizontally on a slide door 52 of an automobile, a slider 54 slidably engaged with the guide rail 53, and a pair of openable/closable links 55, 56 of a generally mountain-shape connected at one end to the slider 54 and connected at the other end to the guide rail 54.

A wire harness 57 is installed to extend, while being bent into a generally U-shape, from the link 55 via the slider 54 to a vehicle body (58)—side fixing portion 59, and one end of the wire harness 57 is connector connected to a slide door-side wire harness 60, and the other end is connector connected to a vehicle body-side wire harness 61.

The pair of links 55, 56 are opened and closed (expanded and contracted) in accordance with the opening and closing of the slide door 52, and the slider 54 moves along the guide rail 53 relative thereto, and is always located in the vicinity of the vehicle body-side fixing portion 59.

FIG. 14 shows a second form of a conventional power feeding apparatus for a slidable structural body (see Patent Literature 2).

This power feeding apparatus 62 is constructed such that three links 65 of different lengths are swingably connected together in a horizontal direction between a slide door 63 of an automobile and a vehicle body 64, and a wire harness 65 is installed to extend from the vehicle body 64 to the slide door 63 along each link 65.

In accordance with the opening and closing of the slide door 63, each link 65 is pivotally moved in an opposite direction to absorb the amount of movement of the slide door 63.

FIG. 15 to FIG. 17 show a third form of a conventional power feeding apparatus for a slidable structural body (see Patent Literature 3).

This power feeding apparatus 67 includes a synthetic resin-made protector (case) 32 mounted on a slide door 68 of an automobile, and a metallic leaf spring 70 which is fixed at one end within the protector and supports and urges a wire harness 69 upwardly at the other end. The protector 32 is formed by a base 32a and a cover 32b (FIG. 17).

The wire harness 69 is installed to extend to the slide door from an opening 71 at a front end of the protector 32, and is installed to extend from an elongated opening 72 at a lower end of the protector 32 via an intervening space 73 to a harness fixing member 12 (FIG. 17) disposed in the vicinity of a vehicle body (74)—side step, and is connected from the harness fixing member 12 to a wire harness (not shown).

The wire harness 69 includes a plurality of insulating sheathed wires and a bendable corrugated tube made of a synthetic resin. The corrugated tube has an oval cross-section (flattened type), and is installed between the protector 32 and the harness fixing member 12, with its longer diameter portion disposed vertically.

When the slide door 68 of FIG. 15 is fully closed, the wire harness 69, while bending the leaf spring 70 downward, is pulled rearward, with the harness fixing member 12 serving as a support point, and when the slide door 68 is fully opened (FIG. 16 shows a condition immediately before the fully-opened condition), the wire harness 69, while bending the leaf spring 70 downward, is pulled forward, with the harness fixing member 12 serving as the support point, and when the slide door 68 is half opened, the wire harness 69 tends to hang down as indicated in chain lines of FIG. 14, but is urged upward by the leaf spring 70, so that its surplus length is absorbed, and the hanging-down and the catching of the wire harness 69 resulting therefrom at the time of closing the door are prevented.

[Patent Literature 1] JP-A-2001-122054 (FIG. 1)
[Patent Literature 2] JP-A-2001-151042
[Patent Literature 3] JP-A-2002-17032 (FIGS. 4 to 5)

However, in the above first power feeding apparatus 51 of FIG. 13, there has been a problem that the number of the parts and the weight are increased by the long guide rail 53 and the links 55, 56, and when the links 55, 56 are expanded and contracted (opened and closed), the wire harness 57 is bent with a small radius between the slider 54 and the link 55, so that a large bending stress acts on the wire harness 57, and therefore there has been a fear that the durability of the wire harness 57 and the operability of the slide door 52 are lowered.

Also, in the above second power feeding apparatus 62 of FIG. 14, the wire harness 66 is bent in a complicated manner in accordance with the pivotal movement of each link 65, and therefore there has been a fear that the durability of the wire harness 66 is lowered. There has been a fear that the wire harness 66 is bent with a small radius particularly between the link 65 and the slide door 63 and between the link 65 and the vehicle body 64, so that a large bending stress acts on the wire harness 66.

Furthermore, in the above third power feeding apparatus 67 of FIG. 15, a surplus length of the wire harness 69 is absorbed (received) into the protector 32, and therefore there has been a problem that the protector 32 is large in size, and occupies a large area inside the slide door 68, so that the degree of freedom of arrangement of other auxiliary equipments, etc., is limited. And besides, the wire harness 69 is received in a bent manner within the protector, and therefore there has been a problem that the long wire harness 69 is needed (the corrugated tube and a wire portion become long), so that the high cost and the increased weight are encountered.

These fears can arise similarly even in the case where for example, each power feeding apparatus is applied not only to the slide door of the automobile but also to a slidable structural body such as a slide door of a train, etc., and a slide door of a producing apparatus, a detecting apparatus, etc. In this case, a vehicle body, an apparatus body, etc., are generically called a fixed structural body.

SUMMARY

In view of the above-mentioned points, it is an object of the present invention to provide a power feeding apparatus for a slidable structural body which is simply constructed with a small number of parts, and can be disposed in a space-saving manner at a low cost by overcoming a large design of a protector (case) and a long design and a heavyweight design of a wire harness, and besides can enhance the reliability of the continuous power feeding by reducing a bending stress of the wire harness in the case where a link is used.

In order to achieve the above object, a power feeding apparatus of the present invention for a slidable structural body includes a link arm which is provided on one of the slidable structural body and a fixed structural body so as to be pivotally moved in a harness surplus length-absorbing direction of a wire harness, a harness holding member which is provided on a distal end side of the link arm so as to be pivotally moved in a harness pulling direction of the wire harness, and a harness fixing portion provided on the other of the slidable structural body and the fixed structural body, and the wire harness is installed to extend from the harness holding member to the harness fixing portion.

With the above construction, for example, the link arm is disposed at the slidable structural body, and when the slidable structural body is moved in opening and closing directions relative to the fixed structural body, the wire harness is pulled with the harness fixing portion serving as a support point at the time of fully opening and at the time of fully closing, and the link arm is pivotally moved in a direction opposite to the surplus length absorbing direction, and the harness holding member is pivotally moved in the wire harness pulling direction, and the bending of the wire harness with a small radius in the vicinity of the harness holding member and the increase of a bending stress resulting therefrom are prevented, and the wire harness is smoothly installed to extend from the harness holding member toward the harness fixing portion with a large diameter or generally linearly. When the slidable structural body is half opened, the wire harness tends to hang down because of its own weight, but the link arm is pivotally moved in the surplus length-absorbing direction by the rigidity of the wire harness, etch, and the harness holding member is restored into a vertical direction by the weight of the harness, thereby preventing the hanging-down of the wire harness. During the sliding of the slidable structural body, the wire harness between the harness holding portion of the link arm and the fixed structural body-side harness fixing portion is installed with the shortest distance, and a short design of the wire harness is achieved. Particularly at the time of fully opening and at the time of fully closing, the wire harness is installed to extend generally straight from the harness holding member toward the harness fixing portion, and therefore the short design of the wire harness is promoted.

Preferably, the harness holding member is supported on the distal end side of the link arm by a shaft portion.

With the above construction, the harness holding member is supported by the shaft portion so as to be pivotally moved in the harness pulling direction, and the above operational effects are positively achieved.

Preferably, the harness holding member is swingably supported on the distal end side of the link arm by a spherical portion.

With the above construction, the harness holding member is supported by the spherical portion so as to be pivotally moved in the harness pulling direction, and also is supported so as to be swingably moved in a three-dimensional direction other than it. For example, even if the wire harness is compressed at the time of half opening the slidable structural body (at the time of absorbing a surplus length), so that a force in a pressing direction acts on the link arm, the harness holding member oscillates to absorb the force in the pressing direction, and therefore the link arm will not be gouged, and the smooth pivotal movement of the link arm is secured, and besides a bending stress of the wire harness in the pressing direction is relieved.

Preferably, the harness holding member is fixed to a sub-arm, and the sub-arm is pivotally connected to the link arm.

With the above construction, the harness holding member is pivotally moved together with the sub-arm relative to the link arm, and therefore the bending stress of the wire harness is relieved. Also, for example, when the link arm is disposed horizontally, the sub-arm is directed downwardly by the weight of the wire harness and the pulling force, and the harness holding member is disposed at a position lower than the link arm, and therefore the amount of upward projection of the wire harness from the harness holding member is reduced, and a low-height design of the power feeding apparatus is achieved, and besides the length of installation of the wire harness from the harness holding member to the fixed structural body is shortened.

Preferably, the harness holding member is displaced outwardly from an axis of the sub-arm.

With the above construction, the harness holding member is disposed at the pivotal distal end side of the link arm in shifted relation, and the distance between the harness holding member and the pivotal proximal end (shaft portion) of the link arm becomes long, and when the wire harness is fixed to the pivotal proximal end side of the link arm, the wire harness is bent with a larger radius between this fixing portion and the harness holding member as compared with the case where the wire harness is not shifted, and the bending load on the wire harness is further relieved.

Preferably, the sub-arm can be expanded and contracted relative to the link arm.

With the above construction, by expanding the sub-arm, the position of the harness holding member is moved away from the link arm, so that the radius of bending of the wire harness becomes large, and the bending stress of the wire harness is relieved, and besides the upward projection of the wire harness from the link arm is kept low. The adjustment of the length of the sub-arm is suitably set according to the diameter and rigidity of the wire harness, etc.

Preferably, the power feeding apparatus for the slidable structural body further includes a resilient member for urging the link arm in the harness surplus length-absorbing direction.

With the above construction, the link arm is urged in the surplus length-absorbing direction by the resilient member, and is pivotally moved together with the wire harness in the surplus length-absorbing direction, so that the harness surplus length is positively absorbed. A torsion coil spring is suited for use as the resilient member from a space-saving point of view.

In the above construction, it is not necessary that the wire harness be received in a bent manner within the protector as in the conventional case, and since the harness holding member is pivotally moved, the wire harness is installed between the harness holding member and the harness fixing portion with a small bending load and also with the shortest distance, and therefore the bending durability of the wire harness is enhanced, so that the reliability of the continuous power feeding is enhanced, and besides the wire harness is shortened, and the harness surplus length is shortened, so that the hanging-down of the wire harness is positively prevented, and the reduction of the cost, the lightweight design, the facilitation of the wire passing operation for passing the wire harness into a protection tube, the elimination of the catching of the harness resulting from the hanging-down, etc., are achieved. Furthermore, the power feeding apparatus is formed into the compact design and lightweight design without using a protector, and therefore the degree of freedom of arrangement of the other parts within the slidable structural body increases, and also the operation for mounting on the slidable structural body, etc., is effected easily.

In the above construction, the harness holding member is firmly and positively supported by the shaft portion, and its pivotal movement in the harness pulling direction is effected smoothly and positively.

In the above construction, the harness holding member effects an oscillating movement through the spherical portion, thereby absorbing a pressing force of the wire harness acting on the link arm, and therefore the link arm is always smoothly pivotally moved with a low friction, and also the bending stress acting on the wire harness in the pressing direction is relieved, and the reliability of the continuous power feeding is further enhanced.

In the above construction, the pivotal movement of the harness holding member and the wire harness is smoothly and positively effected by the pivotal movement of the sub-link, and the bending load on the wire harness is positively reduced. Furthermore, the harness holding member is disposed at the position lower than the link arm, and therefore the height of leading-out of the harness portion led out from the harness holding member toward the link arm is kept low, and the low-height design of the power feeding apparatus is achieved.

In the above construction, the radius of bending of the wire harness along the link arm is increased by an amount corresponding to the amount of shifting of the harness holding member, and the bending stress of the wire harness is further relieved, and the durability of the wire harness is enhanced, and an operating force for opening and closing the slidable structural body is reduced.

In the above construction, the sub-arm is expanded and contracted according to the thickness of the wire harness, etc., thereby determining the position (height) of the harness holding member, and therefore the wire harness disposed along the link arm is bent moderately, and the durability is enhanced, and also the operating force for opening and closing the slidable structural body is reduced, and furthermore the height of upward projection of the wire harness from the link arm is kept low, and the low-height design of the power feeding apparatus can be achieved.

In the above construction, the pivotal movement of the link arm in the harness surplus length-absorbing direction is positively effected by the urging force of the resilient member, and the absorbing of the harness surplus length is positively effected, and a fear for the catching of the wire harness is positively eliminated, and the reliability of the continuous power feeding is enhanced.

BRIEF DESCRIPTION OF THE DRAWINGS

The above object and advantages of the present invention will become more manifest by the description in DETAILED DESCRIPTION OF EXEMPLARY EMBODIMENTS with reference to the accompanying drawings.

FIG. 1A is a front-elevational view showing one embodiment of a power feeding apparatus of the present invention for a slidable structural body at the time of fully closing of the slidable structural body and also at the time of fully opening, and FIG. 1B is a plan view showing the one embodiment of the power feeding apparatus of the present invention for the slidable structural body at the time of fully closing of the slidable structural body and also at the time of fully opening;

FIG. 4A and FIG. 4B show one form of harness holding member at a distal end side of the link arm, and FIG. 4A is a cross-sectional view taken along the line A-A of FIG. 4B, and FIG. 4B is a front-elevational view of the harness holding member at the distal end side of the link arm;

FIG. 6A and FIG. 5B show another form of harness holding member at the distal end side of a link arm, and FIG. 5A is views each showing a cross-section A-A of FIG. 5B for each operation, and FIG. 5B is a front-elevational view of the harness holding member at the distal end side of the link arm;

DETAILED DESCRIPTION OF EXEMPLARY EMBODIMENTS

FIGS. 1 to 2 show one embodiment of a power feeding apparatus of the present invention for a slidable structural body.

Figure 2A:
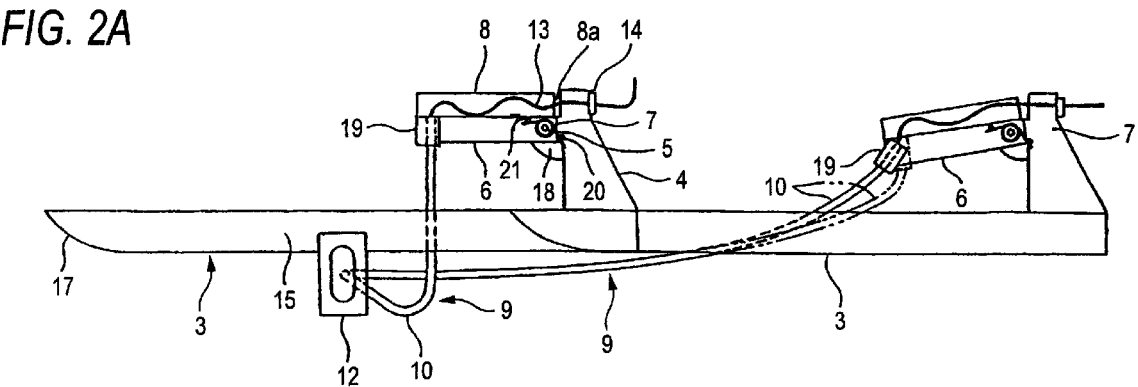
FIG. 2A is a front-elevational view showing a condition when the slidable structural body of the power feeding apparatus is fully closed and also a condition when it is half opened.
Figure 2B:
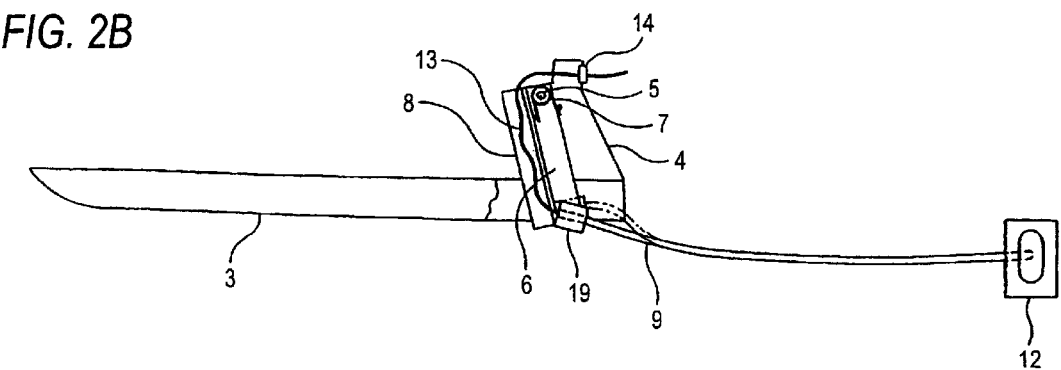
FIG. 2B is a front-elevational view showing the condition when the slidable structural body of the power feeding apparatus is fully opened.

In FIG. 1A and FIG. 1B, the power feeding apparatus is mounted on a slide door (slidable structural body) 2 of an automobile, and in FIG. 1A and FIG. 1B, a right illustration shows a condition when the slide door 2 is fully closed, and a left illustration shows a condition when the slide door 2 is fully opened. In FIG. 2A, a right illustration shows the condition at the time of fully closing of the slide door 2, and a left illustration shows a condition at the time of half opening, and FIG. 2B show the condition at the time of fully opening, these conditions being shown in solid lines.

This power feeding apparatus 1 includes a synthetic resin-made guide case 3 of a narrow-width elongated shape, a support post 4 extending in an upstanding manner from a front end side of the guide case 3, one link arm 6 provided on the support post 4 through a shaft portion 5 so as to be pivotally moved in upward and downward directions, a torsion coil spring (resilient member) 7 for urging the link arm 6 upwardly, a harness guide 8 fixed along the link arm 6, and a harness holding member 19 provided on a distal end (free end) side of the link arm 6 so as to be pivotally moved in forward and rearward directions. Incidentally, in the specification, the forward, rearward, upward, downward, left and right directions coincide with the directions with respect to the vehicle.

One end portion of a synthetic resin-made corrugated tube 10 of a wire harness 9 is fixed to the harness holding member 19, and the corrugated tube portion 10 is installed to extend through the narrow elongated frame-like guide case 3 to a harness fixing member 12 on a vehicle body (fixed structural body) 11 (FIG. 1).

The other end portion of the corrugated tube 10 is fixed to the harness fixing member 12, and a wire portion (not shown) led out of the other end portion of the corrugated tube 10 is installed on the vehicle body, and is connector connected to a vehicle body-side wire harness (not shown). The corrugated tube 10 is an existing harness protection tube (exterior material) which has a circumferential channel-shaped groove and a circumferential ridge alternately arranged in a longitudinal direction of the tube so that the tube can be bent.

Figure 15:
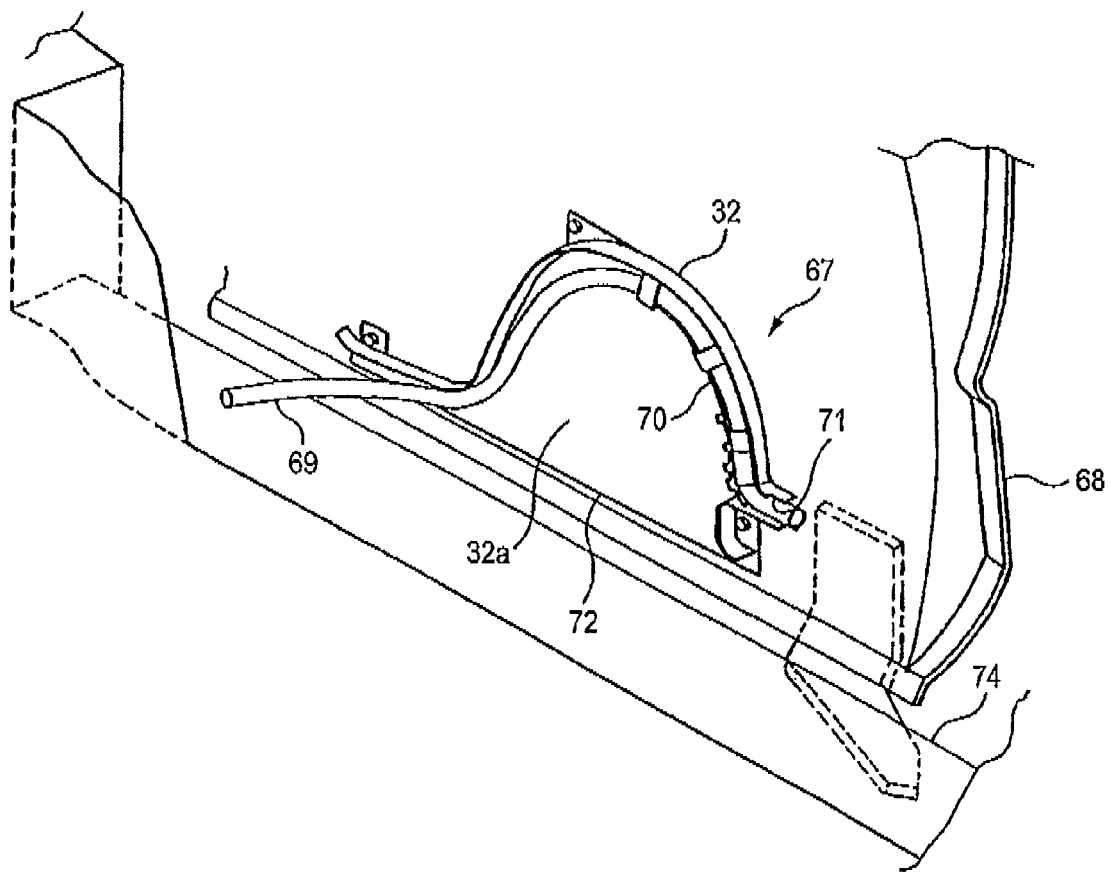
FIG. 15 is a perspective view showing a third form of a conventional power feeding apparatus for a slidable structural body at the time of fully closing of the slidable structural body.
Figure 16:
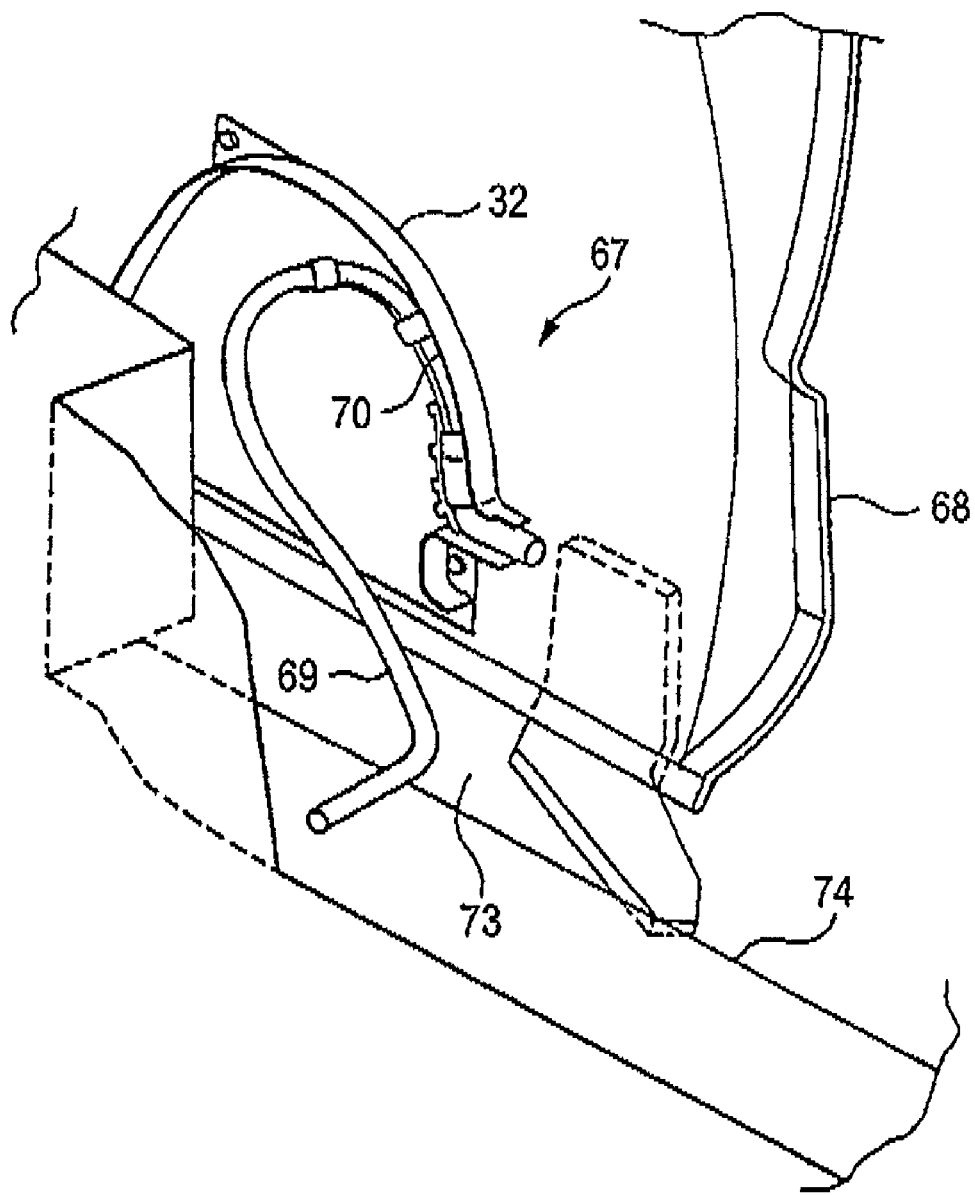
FIG. 16 is a perspective view showing the third form of the conventional power feeding apparatus for the slidable structural immediately before the slidable structural body is fully opened.
Figure 17:
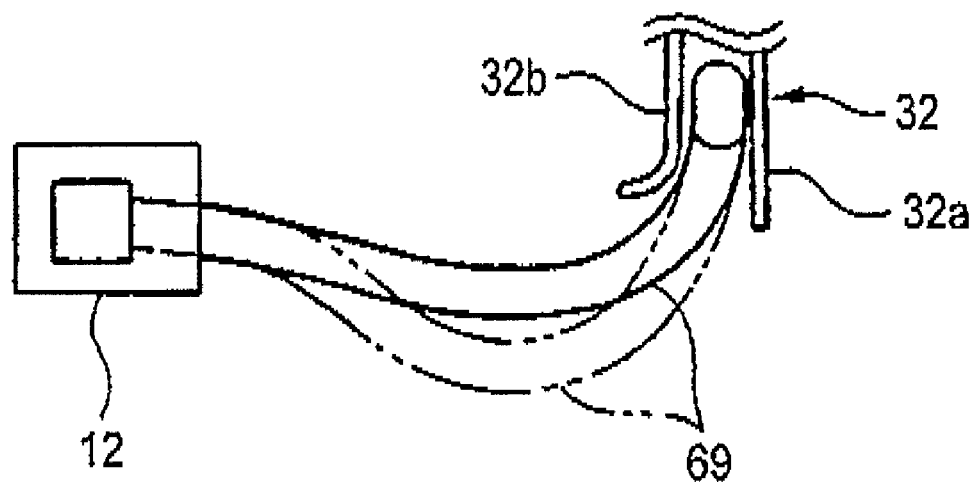
FIG. 17 is a side-elevational view showing a hung-down condition of a wire harness.

Like the corrugated tube of the conventional example of FIG. 15, the corrugated tube 10 of this example has an oval cross-section, and is arranged with its longer diameter disposed vertically. Of course, a corrugated tube having a round cross-section can be used.

A wire portion 13 led out of the one end portion of the corrugated tube 10 is installed along the harness guide 8 while having a surplus length, and is fixed by a harness fixing portion 14 on the support post 4, and is installed within the slide door, and is connector connected to slide door-side auxiliary equipments and wire harness (not shown).

The guide case 3 has the corrugated tube portion 10 of the wire harness 9 (led out of the link arm 6) passed therethrough in the upward-downward direction so as to slidingly guide the corrugated tube portion in the longitudinal direction of the vehicle, and the guide case is formed by a near-side cover 15 and a deep-side base 16 (FIG. 1) into a rectangular frame-like shape elongated in the longitudinal direction of the vehicle. A lower portion 17 of a rear end of the guide case 3 is formed into a curved shape so as to smoothly slide the wire harness. The cover 15 is formed into a cross-sectionally curved shape so that the wire harness, while smoothly curved, is led out toward the vehicle body (see FIG. 6).

The vertical plate-like support post 4 is integrally resin-molded, for example, on a front end portion of the base 16 of the guide case 3. The base 16 and the cover 15 are fixed to each other by retaining members (not shown), and in a disassembled condition, the wire harness 9, together with the harness fixing member 12, can be easily passed through the guide case 3.

The support post 4 has a bearing wall 18 projecting rearwardly from a rear end of an upper portion thereof, and the link arm 6 is pivotally supported on the bearing wall 18 by the shaft portion 5. The harness fixing portion 14 is provided at a front end of an upper portion of the support post 4. The harness fixing portion 14 is, for example, a fixing plate or the like to which the wire is fixed by a band or by winding a tape.

The link arm 6 is formed into a straight elongated plate-like shape, using a synthetic resin material or a metallic material. The harness holding member 19 is pivotally provided on the distal end (free end) side of the link arm 6, and the shaft portion 5 is disposed at a proximal end side. The shaft portion 5 may be one which is integrally formed on and projects from the link arm 6, and is angularly movably engaged in a hole portion of the bearing wall 18, or may be one which is formed on and projects from the bearing wall 18, and is engaged in a hole portion of the link arm 6. Incidentally, the link arm 6 does not need to be straight, and one which is bent in a two-dimensional direction or in a three-dimensional direction can be used as described later (FIG. 9). The shape of the link arm 6 can be suitably adjusted according to vehicle mounting requirements at the time of fully opening, at the time of half opening and at the time of fully closing.

Figure 3:
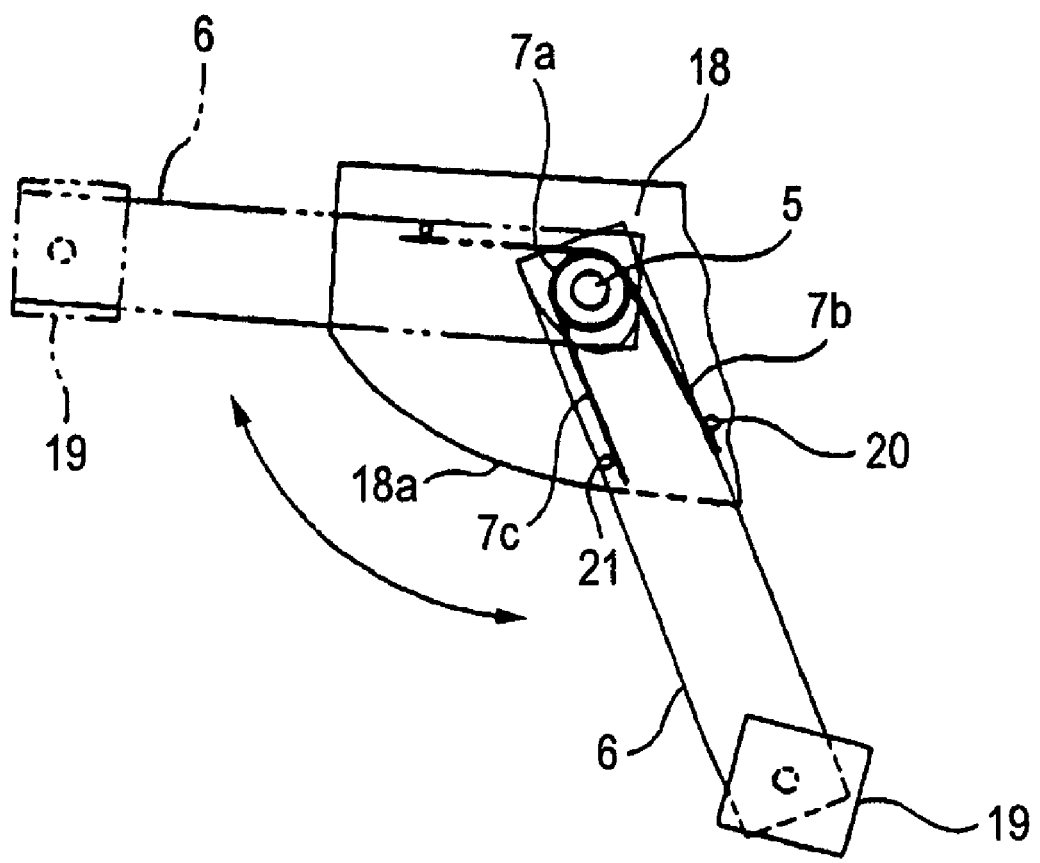
FIG. 3 is a front-elevational view showing one example of a locus of pivotal movement of a link arm of the power feeding apparatus.

As shown in FIG. 3 illustrating one example of a locus of pivotal movement of the link arm 6, an annular coil portion 7a of the torsion coil spring 7 is fitted on the shaft portion 5, and one straight portion 7b of the torsion coil spring 7 continuous with the coil portion 7a abuts against a stop pin 20 on the bearing wall 18, and the other straight portion 7c abuts against a stop pin 21 on the link arm 6, and the link arm 6 is urged upwardly clockwise by a force of the torsion coil spring 7.

When the slide door 2 is fully opened (When the wire harness is pulled), the link arm 6 is pivotally moved forward counterclockwise against the bias of the torsion coil spring 7, and is disposed obliquely forwardly downwardly as indicated in solid lines, and when the slide door 2 is half opened (in a free condition in which a pulling force does not act), the link arm is pivotally moved clockwise by a restoring force of the torsion coil spring 7, and is disposed horizontally as indicated in chain lines. Incidentally, it does not always need to disposed horizontally, and may be disposed in an upwardly inclined manner or disposed in a downwardly inclined manner.

The stop pin 20 on the bearing wall 18 is formed on and projects from a lower extension wall portion 18a, and the extension wall portion 18a is directed downward, and is formed into a fan-shape, and smoothly guides a reverse surface of the link arm 6 in slidingly contacting relation thereto. For example, the link arm 6 abuts at its proximal end surface against a stopper projecting portion (not shown) on the support post 4, so that the link arm is prevented from being pivotally moved upwardly from the horizontal position.

The angle of pivotal movement of the link arm 6 and the range (position) of pivotal movement thereof are not limited to the example of FIG. 3, and for example, there can be the case where the link arm is pivotally moved from the horizontal position within the range of 90° against the bias of the torsion coil spring 7, and is disposed obliquely rearwardly downwardly.

In FIG. 2, the harness guide 8 is disposed along an upper surface of the link arm 6, and is fixed thereto. The harness guide 8 is generally equal in length to the link arm 6, and preferably is formed into a rectangular tubular shape, using a synthetic resin material, and the wire portion 13, while having a surplus length, is received within an internal space thereof such that the wire portion is bent into a wavy shape. A harness protection tube or the like having a relatively high rigidity can be used as the harness guide 8. In FIG. 2, the wire 13 received in the harness guide 8 is indicated by a solid line.

The harness guide 8 is provided for absorbing a surplus length of the wire portion 13 developing in accordance with the pivotal movement of the link arm 6, and it is not necessary in the case where the wire portion 13 is installed along a center axis of the link arm 6. In this case, the wire portion 13 is led out from the center of the harness holding member 19 (at the distal end of the link arm) along the link arm 6, and passes through the center of the shaft portion 5 or the vicinity thereof, and reaches the harness fixing portion 14 on the support post 4.

The vehicle body-side harness fixing member (harness fixing portion) 12 is an existing one, and for example, includes an inner member (not shown) which has at its inner peripheral surface ribs (not shown) engaged in the circumferential channel-shaped groove of the corrugated tube 10 and is formed into a split type, and an outer member (substituted by reference numeral 12) holding the inner member in such a manner that the inner member can be angularly moved in the circumferential direction.

FIG. 4A, FIG. 4B, FIG. 5A and FIG. 5B show forms of pivotal movement mechanisms of link arm-side harness holding members 19, 19'. Like the harness holding member 9 of FIG. 4, the harness holding member 19' of FIG. 5 is applied to the embodiment of FIG. 1 to FIG. 2.

Each harness holding member 19, 19' is of the split type, and is formed into a generally rectangular tubular shape, and has at its inside a hole portion (space) 33 for the passage of the corrugated tube 10 therethrough, and ribs or projections (not shown) for engagement in the circumferential channel-shaped groove of the corrugated tube 10 are formed on an inner peripheral surface of the hole portion 33.

Front and rear wall portions 38 of the harness holding member 19, 19' are divided at their middle portions (A division surface is indicated by reference numeral 40), and in a divided condition, the end portion of the corrugated tube 10 is set in the inside, and left and right division holding members are fixed to each other by retaining members 39 including a retaining frame piece and an engagement projection, or others, One 34 of left and right vertical wall portions of the harness holding member 19, 19' is pivotally supported on the link arm 6 by a shaft portion 35 of FIG. 4 or a spherical portion 36 at a distal end of a shaft portion 37 of FIG. 5.

As shown in FIG. 4A and FIG. 4B, the shaft portion 35 extends through a hole portion 41 of the link arm 6 and a hole portion 42 of the wall portion 34 of the harness holding member 19, and pivotally supports the harness holding member 19 by flange portions 43 at opposite ends thereof and an intermediate flange or plate, with a slight clearance formed between the harness holding member 19 and the link arm 6. The flange portions 43 may be integral with or separate from the shaft portion 35. The shaft portion 35 can be formed integrally with the link arm 6 or the harness holding member 19. These constructions of the shaft portion 35 can be suitably changed according to the need.

The harness holding member 19 is supported by the shaft portion 35 of FIG. 4 so as to be pivotally (swingably) moved in the forward and rearward directions relative to the link arm 6, and when the link arm 6 is pivotally moved, the corrugated tube portion 10 of the wire harness 9 is prevented from being bent with a small radius in the vicinity of the harness holding member 19, and the acting of a large bending stress on the corrugated tube portion 10 and damage, etc., of the corrugated tube resulting therefrom are prevented. Since the corrugated tube portion 10 is smoothly bent with a large radius, the link arm 6 is also smoothly pivotally moved without being subjected to catching, etc.

Figures 5A, 5B:
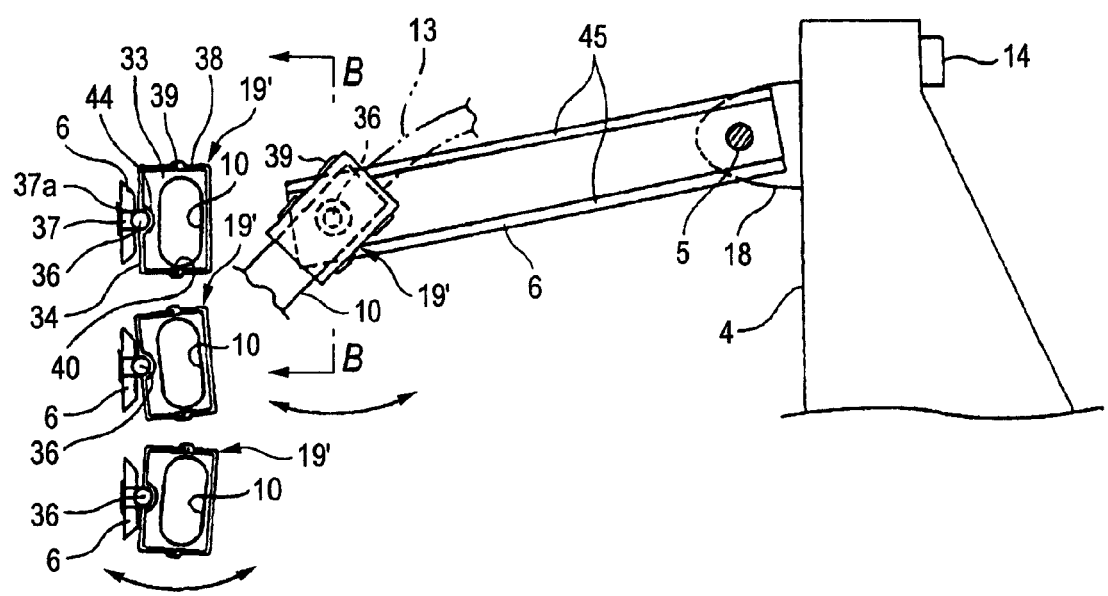

As shown in FIG. 5A and FIG. 5B, a generally hemispherical (accurately, deeper than a hemisphere) recess portion 44 in the vertical wall portion 34 of the harness holding member is slidably engaged with the spherical portion 36 at the distal end of the shaft portion 371 and the spherical portion 36 is retained against withdrawal relative to the recess portion 44, for example, by a stopper ring or the like (not shown). The shaft portion 37 extends through a hole portion of the link arm 6, and is fixed at a flange portion 37a. A ball joint portion is formed by the spherical portion 36 and the recess portion 44.

As shown in FIG. 5A showing three conditions at the same time, the harness holding member 19' is supported by the spherical portion 36 so as to be oscillated in a direction of a plate width of the link arm, and also can be pivotally (swingably) moved in the forward and rearward directions as shown in FIG. 5B. In order that the harness holding member 19', when oscillating, will not interfere with the link arm 6, chamfers 45 are formed by cutting respectively at opposite side portions of the link arm 6 in the direction of the plate width of the link arm 6.

A pressing force of the corrugated tube portion 10 in the direction of the thickness of the link arm (the direction of the width of the vehicle) is canceled by an oscillating movement of the harness holding member 19' of FIG. 5A.

Figure 6:
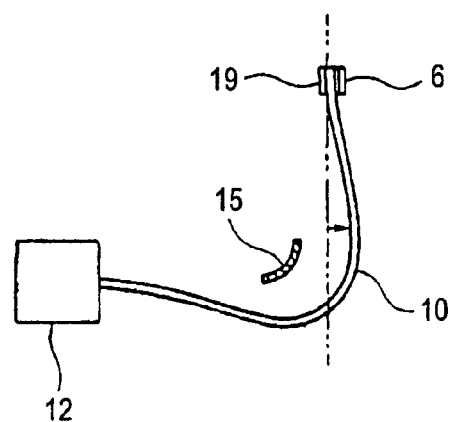
FIG. 6 is a side-elevational view showing a problem solved by the example of FIG. 5.

Namely, as shown in a side-elevational view of FIG. 6 in which with the use of the harness holding member 9 which does not effect any oscillating movement, the corrugated tube 10 is installed to extend to the vehicle body-side harness fixing member 12, a compressive stress due to the rigidity of the corrugated tube 10 is produced from the harness fixing member 12 in a direction of the thickness of the slide door 2 as indicated by an arrow when the slide door 2 is half opened. However, this compressive stress is absorbed by the oscillating movement of the harness holding member 19' of FIG. 5, and a pressing force is prevented from developing in the harness holding member 19' and hence the link arm 6 in the direction of the plate thickness. Therefore, the pivotal movement of the link arm 6 is smoothly effected with a small force, and also the opening and closing operability of the slide door 2 is enhanced. Incidentally, in FIG. 6, reference numeral 15 denotes part of the guide case 3 (FIG. 2).

The operation of the above power feeding apparatus 1 will be described below using FIG. 1 to FIG. 2.

When the slide door 2 is fully closed (the slide door 2 is slid toward the front of the vehicle to be fully closed) as shown in the right illustration of FIG. 2A, the wire harness 9 is pulled rearward with the vehicle body (11)—side harness fixing member 12 serving as a support point, and in accordance with this, the link arm 6 is pivotally moved downward against the bias of the torsion coil spring 7, and is inclined downwardly relative to the horizontal, and also the harness holding member 19 is pivotally moved rearward, and the corrugated tube portion 10 of the wire harness 9 is not bent into a small radius in the vicinity of the harness holding member 19, but is smoothly installed with a large diameter. The case where the harness holding member 19 is not pivotally moved (it is fixed to the link arm 6 in an integral manner) is shown in chain lines.

Therefore, the bending stress acting on the wire harness 9 is reduced, and the durability of the corrugated tube 10 is enhanced. Also, the length of the wire harness (the corrugated tube 10 and the wire portion 13 inside it) is shortened as compared with the case indicated by the chain lines, and a low-cost design and a lightweight design are achieved, and the hanging-down is reduced by an amount corresponding to this shortening, so that a fear for the catching is further eliminated.

Furthermore, the link arm 6 is pivotally moved downward, so that the distance between the harness holding member 19 at the distal end of the link arm and the vehicle body-side harness fixing member 12 becomes the shortest, and a set length of the corrugated tube portion 10 of the wire harness 9 can be made the shortest.

When the slide door 2 is half opened as shown in the left illustration of FIG. 2, the wire harness 9 tends to hang down between the slide door 2 and the vehicle body 11 (FIG. 1). However, the link arm 6 is pushed upward by the urging force of the torsion coil spring 7, and the harness holding member 19, together with the link arm, moves upward to be returned into the vertical direction, so that the corrugated tube portion 10 of the wire harness 9 is pulled up vertically, thereby preventing the hanging-down.

The link arm 6 is located (returned) horizontally, so that the horizontal distance between a front end 8a of the harness guide 8 and the support post (4)—side harness fixing portion 14 is shortened, and therefore the wire portion 13 of the wire harness 9 is bent in a wavy manner within the harness guide 8, so that a surplus length of the wire portion 13 is received.

When the slide door 2 is fully opened as shown in FIG. 2B, the wire harness 9 is pulled forward with the vehicle body-side harness fixing member 12 serving as the support point, and in accordance with this, the link arm 6 is much pivotally moved downward counterclockwise against the bias of the torsion coil spring 7, and is disposed obliquely rearwardly downwardly, and also the harness holding member 19 is pivotally moved counterclockwise through an angle of less than 90°, and is disposed obliquely downwardly relative to the horizontal.

And, the corrugated tube portion 10 of the wire harness 9 is not bent into a small radius in the vicinity of the harness holding member 19, but is smoothly installed with a large radius. The case where the harness holding member 19 is not pivotally moved (it is fixed to the link arm 6 in an integral manner) is shown in chain lines.

Therefore, the bending stress acting on the wire harness 9 is reduced in a similar manner as when fully closing the door, and the durability of the corrugated tube 10 is enhanced. Also, the length of the wire harness (the corrugated tube 10 and the wire portion 13 inside it) is shortened as compared with the case indicated by the chain lines, and the low-cost design and the lightweight design are achieved, and the hanging-down is reduced by an amount corresponding to this shortening, so that a fear for the catching is further eliminated.

Furthermore, the link arm 6 is pivotally moved downward, so that the distance between the harness holding member 19 at the distal end of the link arm and the vehicle body-side harness fixing member 12 becomes the shortest, and the set length of the corrugated tube 10 of the wire harness 9 can be made the shortest.

In accordance with the pivotal movement of the harness guide 8, the wire portion 13 within the harness guide 8 is extended into a condition approximate to a straight condition, with the support post (4)—side harness fixing portion 14 serving as the support point.

As shown in FIG. 2B, the distal end side of the link arm 6, together with the harness guide 8, enters the frame-like guide case 3, and is smoothly guided along the inner surface of the guide case 3 without receiving a gouging force exerted in the harness pulling direction. In accordance with the opening and closing of the slide door 2, the corrugated tube portion 10 of the wire harness 9 is smoothly swung along the guide case 3 in the forward-rearward direction of the vehicle.

As shown in FIG. 1B, the slide door 2, when fully closed, closely contacts the vehicle body 11 to close an opening 30 for getting-on and getting-off purposes, and is moved apart outwardly from the vehicle body 11 immediately after opening the door, and is disposed along an outer surface 11a of the vehicle body 11 at the time of fully opening. This is the same as the conventional case. Reference numeral 31 denotes a rear tire.

As shown in FIG. 1A in which the difference in height between the conventional protector (indicated by a chain line) 32 and the power feeding apparatus 1 of the present invention is indicated by a dimension H, the power feeding apparatus 1 of the present invention is formed into a low height about a half of the height of the conventional protector 32. Therefore, a space occupied by the power feeding apparatus 1 within the slide door 2 is reduced, and the degree of freedom of arrangement of the auxiliary equipments (electrical parts, equipments, etc.) is enhanced.

Furthermore, the wire harness 9 is installed to extend directly from the link arm 6 to the vehicle body in such a manner that the wire harness 9 is not bent within the protector, and therefore the length of the wire harness 9 can be shortened, and the low-cost design and the lightweight design are achieved, and the conveyance and an operation for mounting on the vehicle can be easily effected. Furthermore, the corrugated tube 10 can be shortened, and therefore an operation for passing the wire 13 into the corrugated tube (particularly a tube having no longitudinal slit) is easy.

Figure 13:
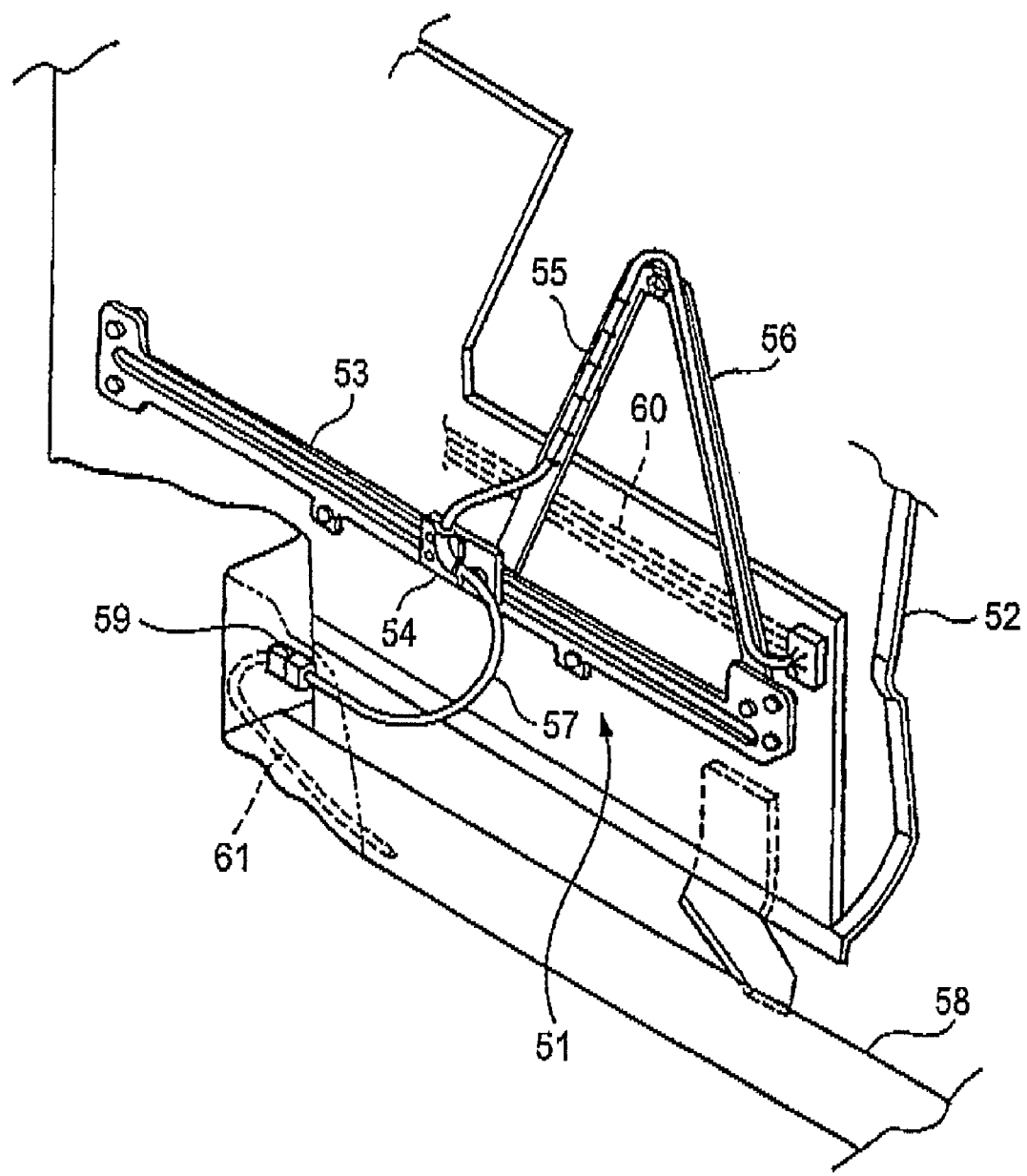
FIG. 13 is a perspective view showing a first form of a conventional power feeding apparatus for a slidable structural body.
Figure 14:
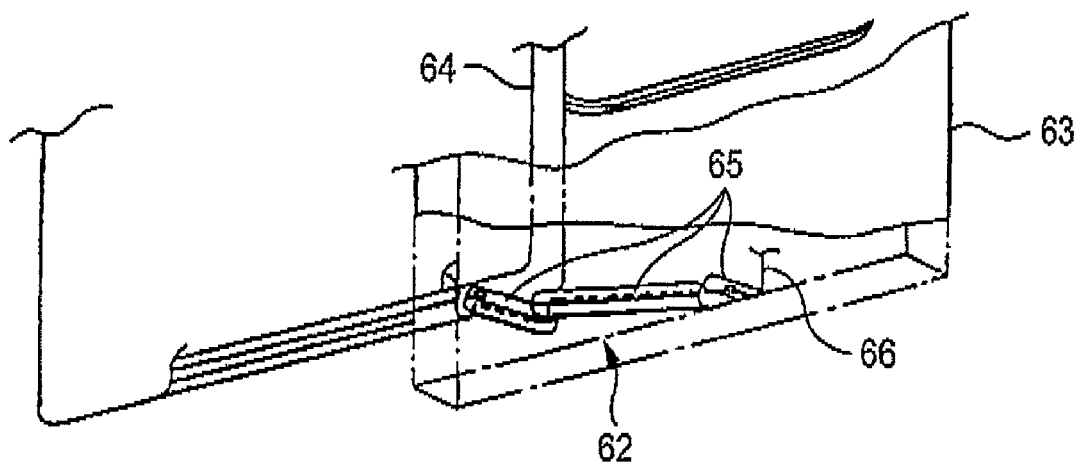
FIG. 14 is a perspective view showing a second form of a conventional power feeding apparatus for a slidable structural body.

Furthermore, a surplus-length portion of the wire harness 9 does not need to be received within the protector 32, and therefore the hanging-down of the wire harness 9 as indicated by solid lines in FIG. 13 is less liable to occur between the slide door 2 and the vehicle body 11, and a fear for the catching at the time of closing the slide door is eliminated.

Figure 7A:
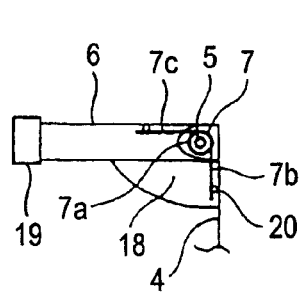
FIG. 7A to FIG. 7C are front-elevational views showing various forms of resilient members for urging a link arm.
Figure 7B:
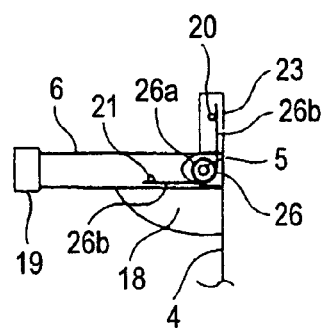
Figure 7C:
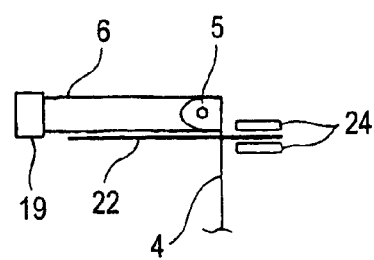

FIG. 7A to FIG. 7C show various forms of resilient members for pivotally returning the link arm 6 in the surplus length-absorbing direction.

FIG. 7A shows a coil spring 7 similar to the above torsion coil spring, and FIG. 7B shows a coil return spring 26 which is another form of torsion coil spring, and FIG. 7C shows a leaf spring 22. Each spring 7, 26, 22 is made of a metallic material.

In the coil spring 7 of FIG. 7A, outer surfaces of two straight portions 7b continuous with a coil portion 7a abut respectively against pins 20, thereby exerting an urging force in a direction to open the two straight portions 7b, 7c.

The coil return spring 26 of FIG. 7B is disposed inverted in the upward-downward direction with respect to the coil spring 7 of FIG. 7A, and an inner surface of one straight portion 26b continuous with a coil portion 26a abuts against a stop pin 20 on an upper extension portion 23 of the bearing wall 18, and an inner surface of the other straight portion 26c abuts against a link arm (6)—side stop pin 21, thereby exerting an urging force in a direction to close the two straight portions 26b, 26c.

The leaf spring 22 of FIG. 7C is disposed horizontally, and a proximal end portion of the leaf spring 22 is inserted in a gap between a pair of upper and lower projecting pieces 24 on the support post 4, and is fixed thereto, and the other portion of the leaf spring 22 except the proximal end portion supports the lower surface of the link arm 6. Simultaneously when the link arm 6 is pivotally moved downward upon pulling of the wire harness 9 (FIG. 2), the leaf spring 22 is bent downward, and when the pulling is canceled, it is restored into the horizontal by a urging force of the leaf spring 22. Each harness holding member 19 in FIG. 7 is pivotally movable.

Figure 8A:
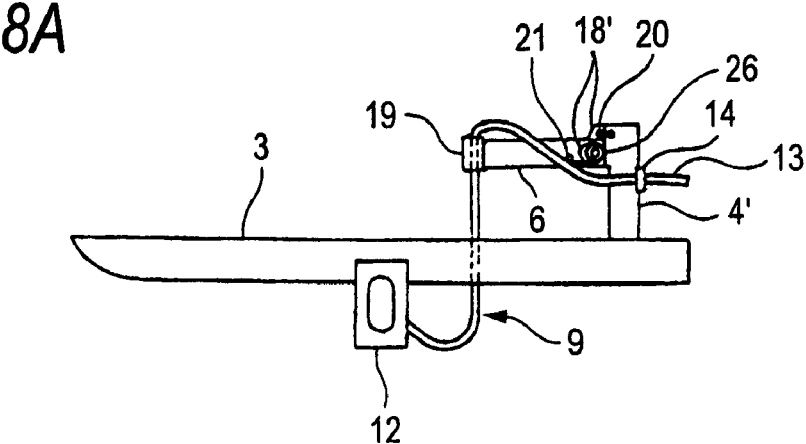
FIG. 8A to FIG. 8C are front-elevational views showing various forms of guide cases of a power feeding apparatus.
Figure 8B:
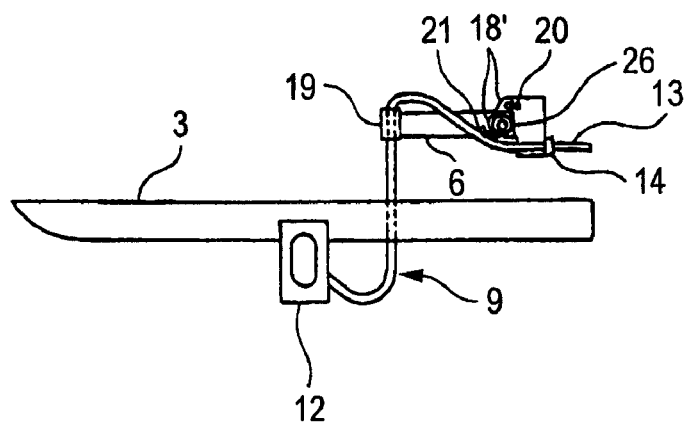
Figure 8C:
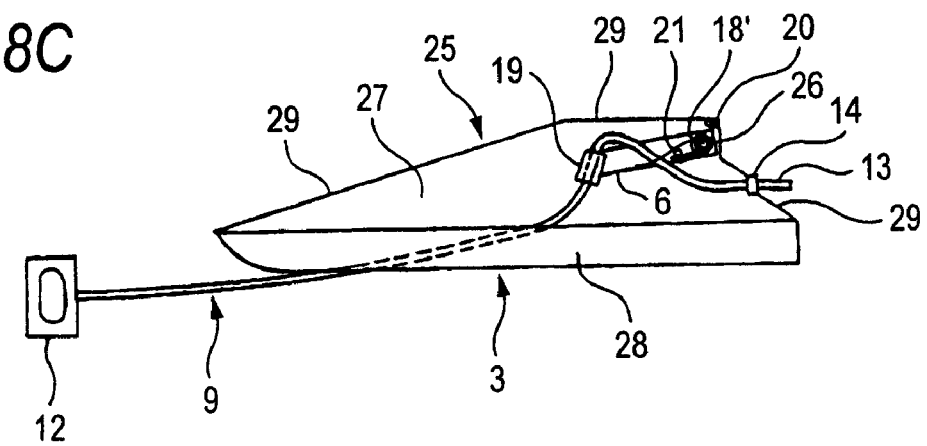

FIG. 8A to FIG. 8C show embodiments of the above guide case 3.

FIG. 8A shows a structure in which a support post 4' having a bearing wall 18' is formed integrally with the guide case 3 similarly to the example of FIG. 1, FIG. 8B shows a structure in which a bearing wall 18' separate from the guide case 3 is provided, for example, at a door inner panel of the slide door 2 (FIG. 1), and FIG. 8C shows a structure in which there is used a protector 25 having the guide case 3 formed integrally therewith.

In each form, for example, the coil return spring 26 of FIG. 7B is used as the resilient member. The same link arm 6, the same pivotal-type harness holding member 19 at a distal end thereof, the same wire harness 9 and the same vehicle body-side harness fixing member 12 are used. The harness guide 8 of FIG. 2 and the lower extension wall 18*a* (FIG. 3) of the support post 4 are omitted.

In FIG. 8A, as the support post 4', not a generally trapezoidal one of FIG. 2 but a straight one is used. A wire portion 13 of the wire harness 9 is installed to extend in a bent manner from the harness holding member 19 at the distal end of the link arm 6 along the link arm 6, and is fixed at a support post-side harness fixing portion 14.

In FIG. 8B, there is no support post 4', and a wire portion 13 of the wire harness 9 is installed to extend in a bent manner from the harness holding member 19 at the link arm 6 to a harness fixing portion 14 at a front end of the bearing wall (bearing plate) 18'. The bearing wall 18' is fixed to the metallic door inner panel by the fastening of a bolt, the insertion of a retaining clip, etc.

In FIG. 8C, the link arm 6, while urged by the torsion coil spring 26, is pivotally movably disposed within an internal space of the protector 25 formed by a deep-side protector base 27 and a near-side protector cover (not shown). A vertical base plate portion of each of the base 25 and the cover of the protector 25 serves also as a bearing wall 18'. A pin 20 for the torsion coil spring is formed on and projects from the base 27. A harness fixing portion 14 is provided at an opening at a front end of the base 27.

The protector 25 is formed into a low height about a half of the height of the conventional (FIG. 15) protector. An opening 28 of an elongated shape similar to that of the conventional example is provided in a lower end of the protector 25. The elongated opening 28 is similar to an opening of each of the guide cases of FIG. 5A and FIG. 8B. The three sides, that is, the upper side and front and rear sides, of the protector 25 are closed by a peripheral wall 29.

Figure 9A:
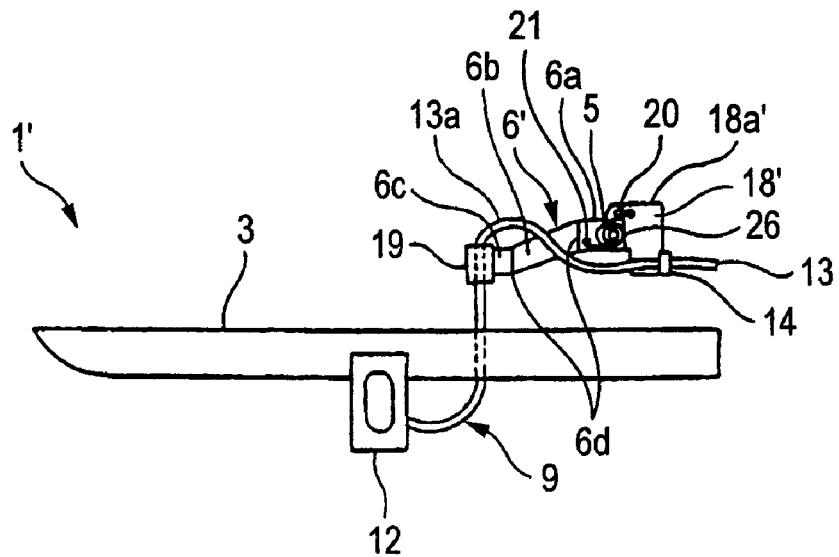
FIGS. 9A and 9B are front-elevational views showing power feeding apparatuses using other embodiments of link arms, respectively.
Figure 9B:
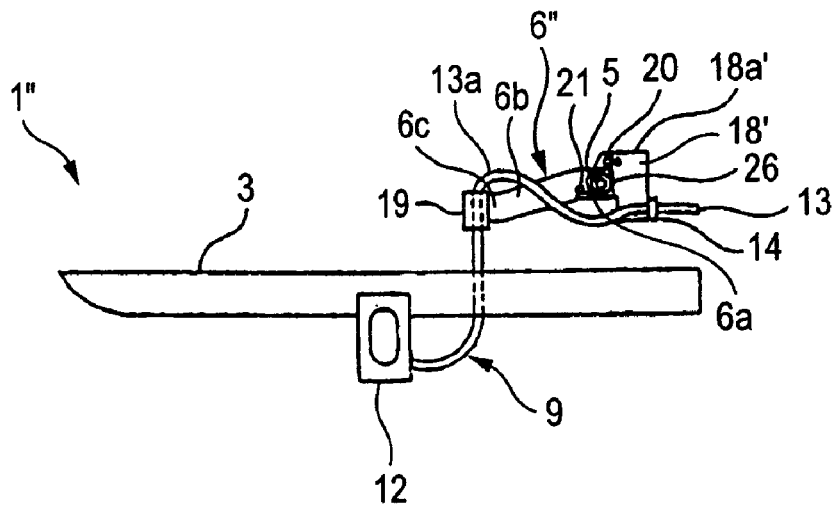

FIG. 9A and FIG. 9B show power feeding apparatuses using other embodiments of link arms, respectively. The construction except the link arm is generally similar to the embodiment of FIG. 8B, and therefore identical reference numerals are used for similar constituent portions, and description thereof will be omitted.

The link arm 6' of FIG. 9A is shaped such that it is slanting downwardly gradually from a shaft portion (5) side, and includes a shaft portion (front)-side horizontal straight portion 6*a*, an intermediate slanting portion 6*b*, and a distal end (rear)-side horizontal straight portion 6*c*. Here, "horizontal" is one example in a condition in which the link arm 6' is raised by an urging force of a torsion coil spring 26 when the slide door 2 is half opened, and it does not always need to be horizontal. This is the same with FIG. 9B. The intermediate slanting portion 6*b* and the distal end-side straight portion 6*c* may be bent in a direction of a plate thickness of the link relative to the shaft portion-side straight portion 6*a* at vertical intersecting line portions 6*d*. A harness holding portion 19 is fixed to the distal end-side straight portion 6*c* so as to be pivotally moved.

The link arm 6" of FIG. 9B is shaped such that it is slanting downwardly from a shaft portion (5) side to assume a generally S-shaped curve, and includes a shaft portion—side short horizontal straight portion 6*a*, an intermediate long bent portion 6*b*, and a distal end-side short horizontal straight portion 6*c*. The intermediate slanting portion 6*b* and the distal end-side straight portion 6*c* may be bent in a direction of a plate thickness of the link relative to the shaft portion-side straight portion 6*a*. A harness holding portion 19 is fixed to the distal end-side straight portion 6*c*.

In the embodiments of FIG. 9A and FIG. 9B, when the slide door 2 is half opened, the distal end side of the link arm 6', 6", that is, the pivotal harness holding portion 19, is disposed at a position lower than the shaft portion 5, and therefore there is no fear that a wire portion 13 projecting upwardly from the harness holding portion 19 projects upwardly beyond an upper end 18*a'* of a bearing wall 18', and a low-height design of the power feeding apparatus 1', 1" is more positively achieved.

Figure 10A:
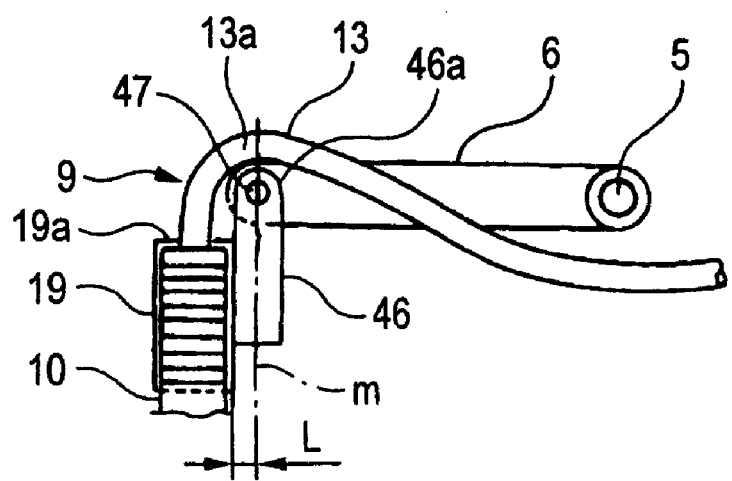
FIG. 10A is a front-elevational view showing an embodiment in which a sub-arm is provided on a link arm.
Figure 10B:
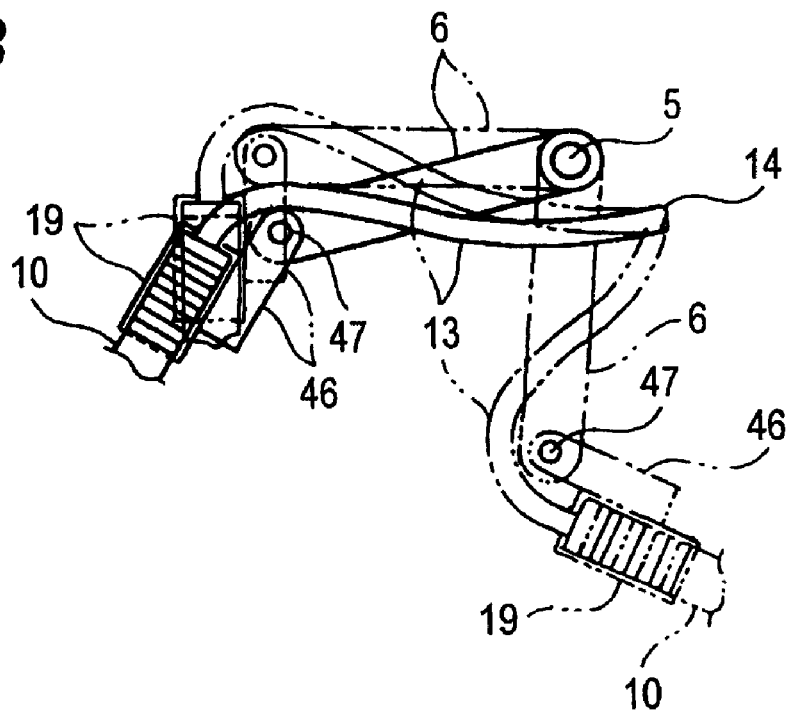
FIG. 10B is a front-elevational view showing a condition of the sub-arm when the link arm is pivotally moved.

FIG. 10A and FIG. 10B show an embodiment of a power feeding apparatus in which a sub-arm 46 is pivotally connected to a distal end side of a link arm 6, and a harness holding member 19 is provided at the sub-arm 46. The construction except it is similar to the embodiment of FIG. 2, etc., and therefore similar constituent portions will be designated by identical reference numerals, and detailed description thereof will be omitted.

Like the link arm 6, the sub-arm 46 is preferably formed of a synthetic resin material. As shown in FIG. 10A, a length of the sub-arm 46 is less than a half of a length of the link arm 6. A proximal end portion of the sub-arm 46 is supported by a shaft portion 47 on the distal end portion of the link arm 6 so that it can be pivotally moved in a vertical plane. A proximal end portion of the link arm 6 is supported by a shaft portion 5 on a bearing wall 18 of a support post 4 or an independent bearing wall 18' (FIG. 8B) similar to those of the above examples so that it can be pivotally moved in a vertical plane.

The harness holding member 19 is fixed to an outer surface of the sub-arm 46, and one end portion (upper end portion) of a corrugated tube 10 of a wire harness 9 is fixed to the harness holding member 19. The harness holding member 19 is displaced from an axis (centerline) m of the sub-arm 46 by a dimension L which is a half of a width of the sub-arm 46. The shaft portion 47 at the proximal end of the sub-arm 46 and the shaft portion 5 at the proximal end of the link arm 6 are disposed on the same axis. The other end portion of the corrugated tube 10 is fixed to a vehicle body-side harness fixing member 12 (FIG. 2). A wire portion 13 of the wire harness 9 passes through the interior of the corrugated tube 10.

The wire portion 13 led out of the upper end of the corrugated tube 10 is smoothly bent along a semi-circular proximal end 46*a* of the sub-arm 46, and downwardly intersects the link arm 6 therealong, and is installed on a slide door, and is connector connected to auxiliary equipments, etc.

In a condition in which the sub-arm 46 is directed vertically downwardly as shown in FIGS. 10A, a certain vertical distance is set between an upper end 19*a* of the harness holding member 19 and the shaft portion 47, and therefore even when the wire portion 13 led upwardly out of the upper end 19*a* of the harness holding member 19 is bent into a generally inverted U-shape or a generally arc-shape with a relative large radius while it has a certain degree of rigidity, the wire portion will not much project upwardly beyond the horizontal link arm 6, and a height of an upper end of a bent portion 13*a* of the wire portion 13 is kept to a minimum, thereby achieving a low-height design of the power feeding apparatus (power feeding structure).

FIG. 10A shows a condition at the time of half opening of the slide door, and FIG. 10B shows the condition at the time of half opening of the slide door (An illustration shown at the upper side in chain lines), a condition at the time of full closing (An illustration shown at an intermediate portion in solid lines) and a condition at the time of full opening (An illustration shown at the lower side in chain lines).

When the slide door is half opened, the link arm 6 is disposed horizontally, and the sub-arm 46, together with the corrugated tube 10, is directed vertically downwardly. When the slide door is fully closed, the link arm 6 is slightly pivotally moved downwardly about the shaft portion 5, and the sub-arm 46 is pivotally moved about the shaft portion 47 together with the corrugated tube 10 through an angle larger than that of the link arm 6, and is directed obliquely rearwardly downwardly, and the wire portion 13 of the wire harness 9 is disposed at a position lower than that at the time of half opening of the door, with a harness fixing portion 14 (FIG. 2, etc.) serving as a support point. When the slide door is fully opened, the link arm 6 is pivotally moved about the shaft portion 5 to be directed downwardly approximately vertically, and the sub-arm 46 is pivotally moved about the shaft portion 47 together with the corrugated tube 10, and is directed obliquely forwardly downwardly, and the wire portion 13 is directed downwardly with the harness fixing portion 14 serving as the support point.

Figure 11:
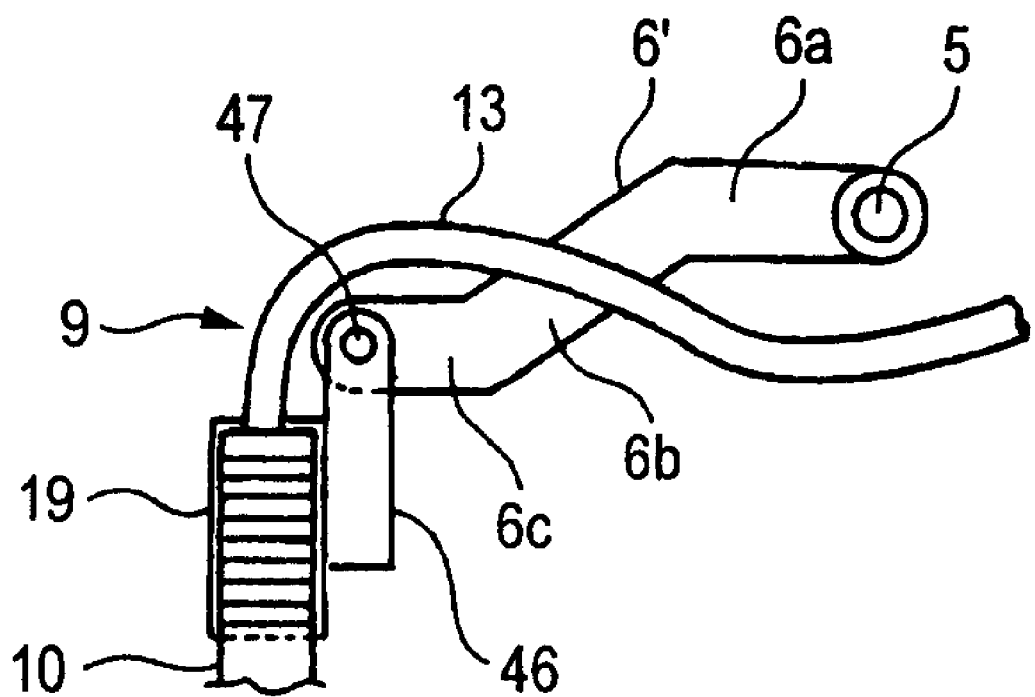
FIG. 11 is a front-elevational view showing an example in which the sub-arm is provided on the bent link arm of FIG. 9.

FIG. 11 shows an example in which in the embodiment of FIG. 10, as the link arm 6', one which is bent into a generally crank-shape of FIG. 9 is used. Similar constituent portions to FIG. 10 will be designated by identical reference numerals, and detailed description thereof will be omitted.

The link arm 6' includes front and rear straight portions 6a, 6c, and an intermediate slanting portion 6b, and is disposed such that it is slanting downwardly toward its distal end, and therefore in a horizontal condition of the link arm 6' (in a half-open condition of a slide door), a height of a wire portion 13 is kept to a low height in combination with the effect of suppressing the height of the wire portion 13 of a wire harness 9 by a sub-arm 46, and a low-height design of a power feeding apparatus is achieved.

Figure 12A:
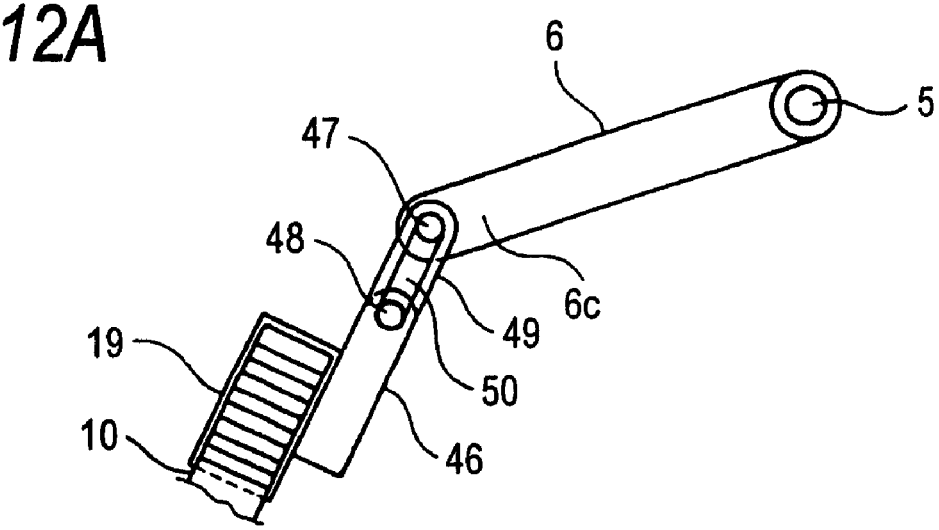
FIG. 12A is a front-elevational view showing an example in which a sub-arm is provided on a link arm in such a manner that its position can be adjusted.
Figure 12B:
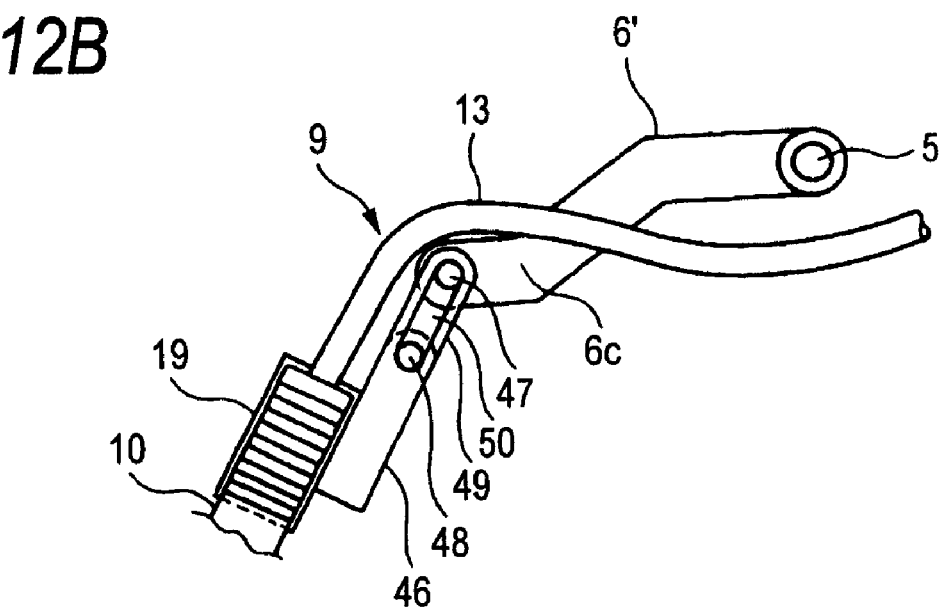
FIG. 12B is a front-elevational view showing a condition in which a wire is installed along a link arm.

FIG. 12A and FIG. 12B show embodiments in which a sub-arm 46 is provided on the link arm 6, 6' of FIG. 10 and FIG. 11 so as to be expanded and contracted, and a length of the sub-arm 46, that is, the position of a harness holding member 19 fixed to the sub-arm 46, can be adjusted.

For reference, the present Applicant has proposed in Japanese Patent Application No. 2006-306641 a construction in which the link arm 6 can be expanded and contracted, and the present Applicant has proposed in Japanese Patent Application No. 2006-295324 a construction in which the harness holding member 19 is immovably fixed to the link arm 6.

In FIG. 12A and FIG. 12B, as one example of a position adjustment mechanism, one end portion of a slot 50 of a guide plate (guide member) 49 is angularly movably and unslidably engaged with a shaft portion 47 at a distal end of the link arm 6, and a shaft portion 48 at a proximal end of the sub-arm 46 is slidably and angularly immovably engaged in the other end portion of the slot 50 of the guide plate 49, and the sub-arm 46 is slidable along the guide plate 49 in a longitudinal (axial) direction, and the sub-arm 46 can be fixed at a desired position in the longitudinal direction of the guide plate 49 by a screw fastening operation for the shaft portion 48 of the sub-arm 46.

In the embodiments of FIGS. 12A and 12B, the sub-arm 46 moves downward together with the harness holding member 19, and is disposed at a position lower than that in the examples of FIG. 10 and FIG. 11, and therefore as shown in FIG. 12B, a wire portion 13 led out of an upper end of a corrugated tube 10 fixed by the harness holding member 19 is bent with a large radius, and is installed in closely contacting relation to an upper end of a distal end-side portion 6c of the link arm 6' (In the example of FIG. 11, a gap is formed between the wire portion 13 and the upper end of the distal end-side portion of the link arm 6.), and therefore the amount of upward projection of the wire portion 13 is further reduced, and the height of a power feeding apparatus (power feeding structure) is further lowered. Needless to say, the stepped link arm 6' of FIG. 12B can keep the upward projection of the wire portion 13 to a height lower than that achieved with the straight link arm 6 of FIG. 12A.

Furthermore, in each of the embodiments of FIG. 10 to FIG. 12, the harness holding member 19 is disposed at the position lower than the link arm 6, 6', and the upwardly-directed wire portion 13 of the wire harness 9 is moderately bent with a large radius, and therefore a stress acting on the wire portion 13 at the time of pivotal movement of the link 6, 6' is relieved, and the bending durability of the wire harness 9 is enhanced.

Furthermore, the sub-arm 46 is shifted, and the harness holding member 19 at the distal end of the sub-arm, that is, the end portion of the wire harness 9, is shifted, and therefore even when the slide door is in any condition (fully open, half open and fully closed), the development of stresses due to the rigidity, bending, etc., of the wire portion (the wire portion located in the installation path to the slide door-side auxiliary equipments) 13 is relieved, and the opening and closing operation of the slide door is smoothly effected.

Furthermore, since the harness holding member 19 is shifted, the distance between the harness holding member 19 and the vehicle body-side harness fixing member 12 (FIG. 2, etc.) at the time of full opening of the door is covered by the shortest path, and therefore the length of the wire harness can be set to the shortest length. Therefore, the amount of hanging-down of the wire harness 9 at the time of half opening of the door is reduced, and a harness surplus length at the intervening portion between the slide door and the vehicle body is positively absorbed.

Incidentally, in the embodiments of FIG. 10 to FIG. 12, although the harness holding member 46 is disposed in shifting relation to the axis m of the sub-arm 46, the harness holding member 46 can be disposed, for example, on the axis m of the sub-arm 46, and in this case, also, the harness holding portion 19 is disposed at a position lower than the shaft portion 47 at the distal end of the link arm 6, and therefore the upward projection of the wire portion 13 is suppressed, and besides the wire harness length from the harness holding member 19 to the vehicle body-side harness fixing member 12 is reduced.

Furthermore, in each of the above embodiments, although the power feeding apparatus 1 is disposed vertically (vertically) at the slide door (slidable structural body) 2, the power feeding apparatus 1 can be disposed, for example, horizontally (horizontally) in the case where the slide door 2 has the sufficient thickness as when FIG. 1 to FIG. 2 are seen as plan views, and this can be applied particularly to a slide door other than that of the automobile.

Furthermore, the power feeding apparatus 1 can be horizontally (horizontally) disposed not at the slide door 2 but at the vehicle body (fixed structural body) 11, and the harness fixing member 12 can be disposed not at the vehicle body 11 but at the slide door 2.

Furthermore, in each of the above embodiments, although the corrugated tube 10 is used as the harness protection tube, a resin tube having no concave and convex portions (bellows), a flexible mesh-like tube, etc., (not shown) can be used instead of the corrugated tube, or the plurality of wires 13 can be bundled together by tape-winding or others without using the protection tube. In these cases, the protection tube of the wire harness 9 is fixed to the link arm-side harness holding member 19 of the split type by adhesive bonding, sharp claws or others, or the bundle of wires are fixed by gripping or others.

Furthermore, in each of the above embodiments, although there is used the guide case 3 for guiding the wire harness 9 at the low position toward the vehicle body, for example, the guide case 3 can be omitted, and the wire harness 9 can be installed to extend directly from the harness holding member 19 at the distal end of the link arm toward the vehicle body.

Furthermore, in each of the above embodiments, although the range of pivotal movement of the link arm 6, 6' is set to more than 90° from the horizontal, the position of pivotal movement and the angle of pivotal movement of the link arm 6, 6' can be suitably set according to the amount of the stroke of the slide door 2 and the length of the wire harness 9. For example, in case the link arm 6 is urged to be pivotally moved upwardly beyond the horizontal at the time of half opening of the slide door 2 of FIG. 2A, the increase of the harness surplus length-absorbing amount can be dealt with.

Furthermore, in each of the above embodiments, although there is provided the resilient member 7, 24, 26 for urging the link arm 6, 6' in the harness surplus length-absorbing direction (upward direction), the resilient member 7, 24, 26 can be omitted, and the wire harness 9 can be restored upwardly (in the surplus length-absorbing direction), for example, utilizing the rigidity of the corrugated tube 10 at the time of half opening the slide door.

Furthermore, in each of the above embodiments, although the examples in which the embodiments are applied to the slide door 2 of the automobile have been described, the above power feeding apparatus can be applied not only to the slide door 2 of the automobile but also to a slidable structural body such as a slide door of a train, etc., and a slide door of a producing apparatus, a detecting apparatus, etc. The vehicle body, etc., are generically called the fixed structural body.

Furthermore, the above power feeding apparatus for the slidable structural body is also effective as a power feeding structure for a slidable structural body, a harness installation structure for the slidable structural body, a method of feeding power to the slidable structure body, etc.

Although the present invention have been described in detail with reference to the specific embodiments, it is obvious to those skilled in the art that various changes and modifications can be added without departing the spirits and scope or intended scope of the present invention.

The present invention is based on Japanese Patent Application (Patent Application No. 2006-306642) filed on Nov. 13, 2006 and Japanese Patent Application (Patent Application No, 2007-027710) filed on Feb. 7, 2007, and the contents thereof are incorporated herein as a reference.

What is claimed is:

1. A power feeding apparatus for a slidable structural body, comprising:
    a link arm which is provided on one of the slidable structural body and a fixed structural body and is pivotally extending therefrom in a cantilevered manner so as to be pivotally moved to absorb an excess length of a wire harness;
    a harness holding member which is provided on a distal end of the link arm so as to be pivotally moved in a harness pulling direction of the wire harness; and
    a harness fixing portion provided on the other of the slidable structural body and the fixed structural body,
    wherein the wire harness is installed to extend from the harness holding member to the harness fixing portion; and
    wherein the link arm does not slidably move with respect to the one of the slidable structural body and fixed structural body on which the link arm is provided.

2. The power feeding apparatus for a slidable structural body according to claim 1, wherein the harness holding member is supported on the distal end of the link arm by a shaft portion.

3. The power feeding apparatus for a slidable structural body according to claim 1, wherein the harness holding member is swingably supported on the distal end of the link arm by a spherical portion.

4. The power feeding apparatus for a slidable structural body according to claim 1, wherein the harness holding member is fixed to a sub-arm, and the sub-arm is pivotally connected to the link arm.

5. The power feeding apparatus for a slidable structural body according to claim 4, wherein the harness holding member is displaced outwardly from an axis of the sub-arm.

6. The power feeding apparatus for a slidable structural body according to claim 4, wherein the sub-arm can be expanded and contracted relative to the link arm.

7. The power feeding apparatus for a slidable structural body according to claim 1, further comprising a resilient member for urging the link arm a pivoting direction of the link arm.

8. The power feeding apparatus for a slidable structure according to claim 1, wherein the pivoting plane includes both of an extending direction of the slidable structural body and an opening and closing direction of the slidable structural body with respect to the fixed structural body.

9. The power feeding apparatus for a slidable structural body according to claim 1, wherein the link arm pivotally moves in a pivoting plane which is perpendicular to a facing direction in which the slidable structural body faces the fixed structural body.

10. The power feeding apparatus for a slidable structural body according to claim 1, wherein the harness holding member pivotally moves in a pivoting plane which is perpendicular to a facing direction in which the slidable structural body faces the fixed structural body.

11. The power feeding apparatus for a slidable structural body according to claim 1, wherein a first end of the link arm is pivotally connected to the one of the slidable structural body and the fixed structural body, and a second end of the link arm is free to move in a cantilever manner.

* * * * *